(12) United States Patent
Kato

(10) Patent No.: US 11,792,064 B2
(45) Date of Patent: Oct. 17, 2023

(54) NETWORK MANAGEMENT AND COMMUNICATION PROTOCOL ANALYSIS FOR NETWORK DEVICES IN A NETWORK

(71) Applicant: RENESAS ELECTRONICS CORPORATION, Tokyo (JP)

(72) Inventor: Tatsuya Kato, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/668,833

(22) Filed: Feb. 10, 2022

(65) Prior Publication Data

US 2022/0286345 A1 Sep. 8, 2022

(30) Foreign Application Priority Data

Mar. 5, 2021 (JP) ................. 2021-035128

(51) Int. Cl.
| | | |
|---|---|---|
| G06F 15/16 | (2006.01) | |
| H04L 41/0213 | (2022.01) | |
| H04L 61/30 | (2022.01) | |
| H04L 41/12 | (2022.01) | |

(52) U.S. Cl.
CPC .......... H04L 41/0213 (2013.01); H04L 41/12 (2013.01); H04L 61/30 (2013.01)

(58) Field of Classification Search
CPC .................................. H04L 41/0213
USPC .................................. 709/209, 224
See application file for complete search history.

(56) References Cited

U.S. PATENT DOCUMENTS

| 7,580,936 B2 * | 8/2009 | Salgado .................. H04L 12/66 |
| 10,382,259 B2 | 8/2019 | Igarashi | |
| 2008/0301267 A1 * | 12/2008 | Chang ..................... H04L 41/12 |
| | | 709/220 |
| 2017/0085438 A1 * | 3/2017 | Link ..................... H04L 41/024 |
| 2018/0069752 A1 * | 3/2018 | Igarashi .............. H04L 41/0853 |

FOREIGN PATENT DOCUMENTS

JP 2018-041146 A 3/2018

\* cited by examiner

*Primary Examiner* — Hee Soo Kim
(74) *Attorney, Agent, or Firm* — McDermott Will & Emery LLP

(57) ABSTRACT

A conventional network managing method has a problem that there is a high possibility that a setting error of communication software occurs. According to one embodiment, a non-transitory computer-readable medium including a network managing program is executed in a master apparatus, system information stored in a slave apparatus in advance is read out in a procedure conforming to an SNMP, protocol information in which a communication protocol that can be used by the slave apparatus is described is read out from the slave apparatus by using an object ID described in the system information thus read out, and the protocol information thus read out is referred to start communication with the slave apparatus by executing software corresponding to the communication protocol.

7 Claims, 8 Drawing Sheets

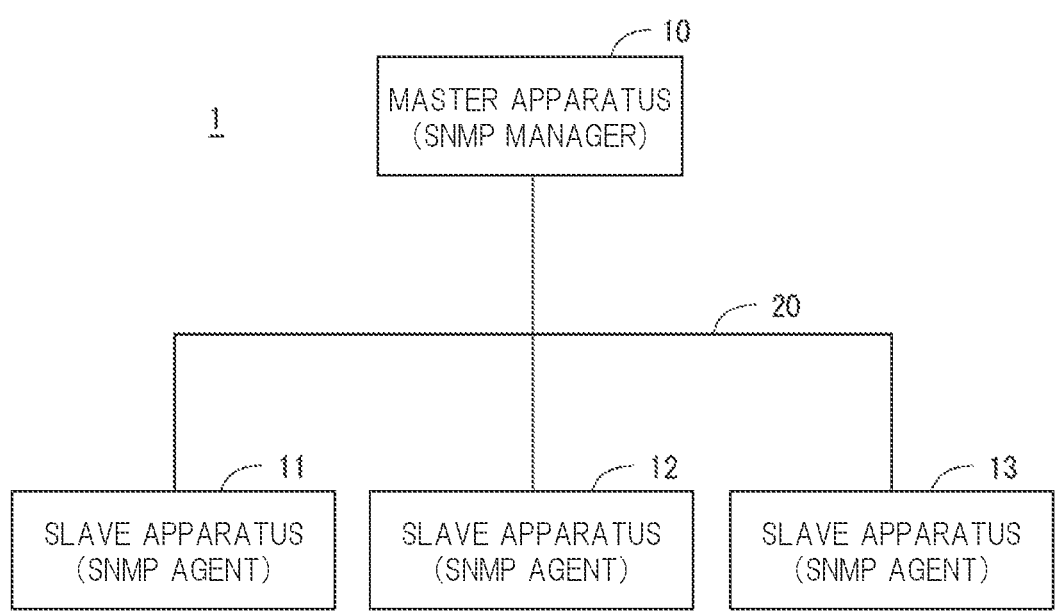

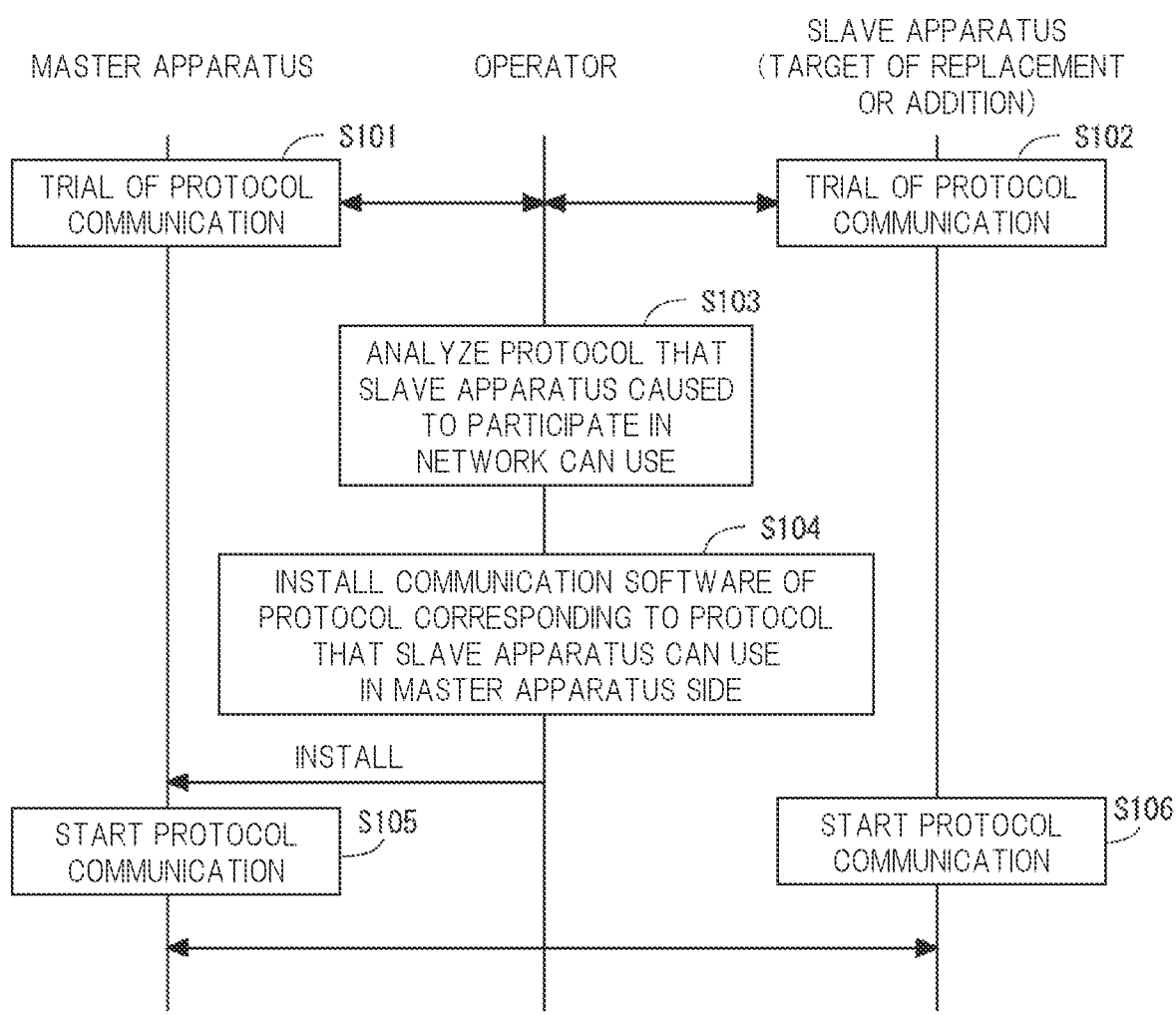

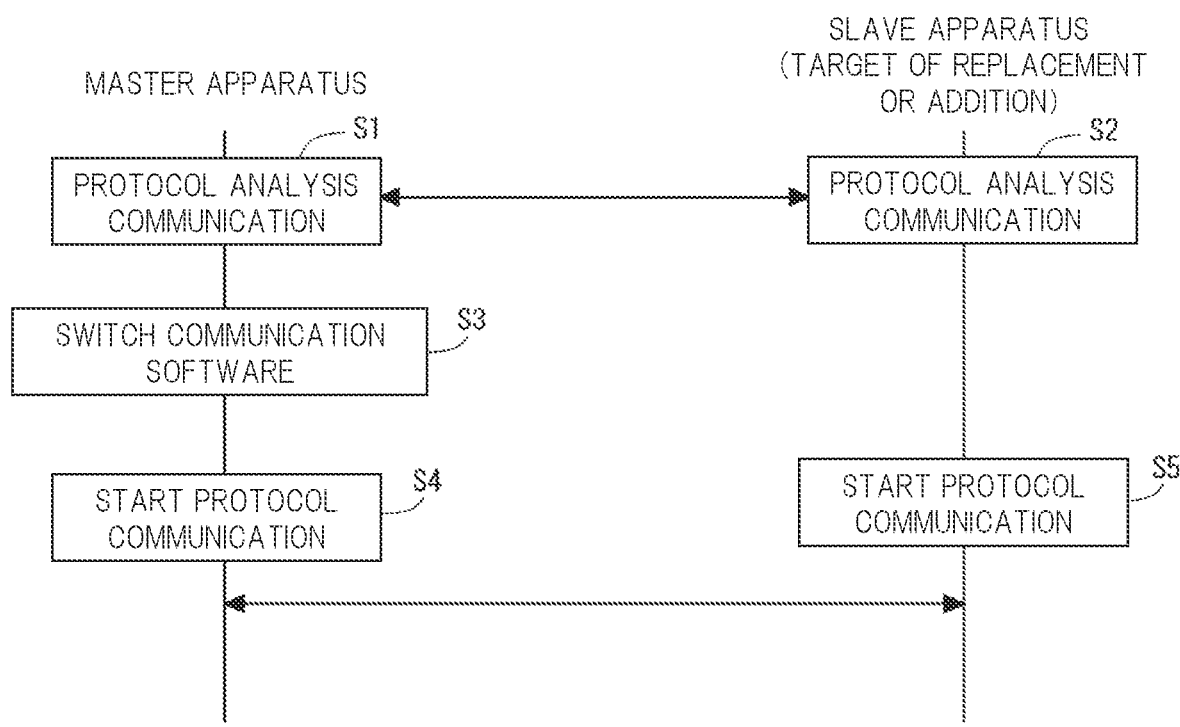

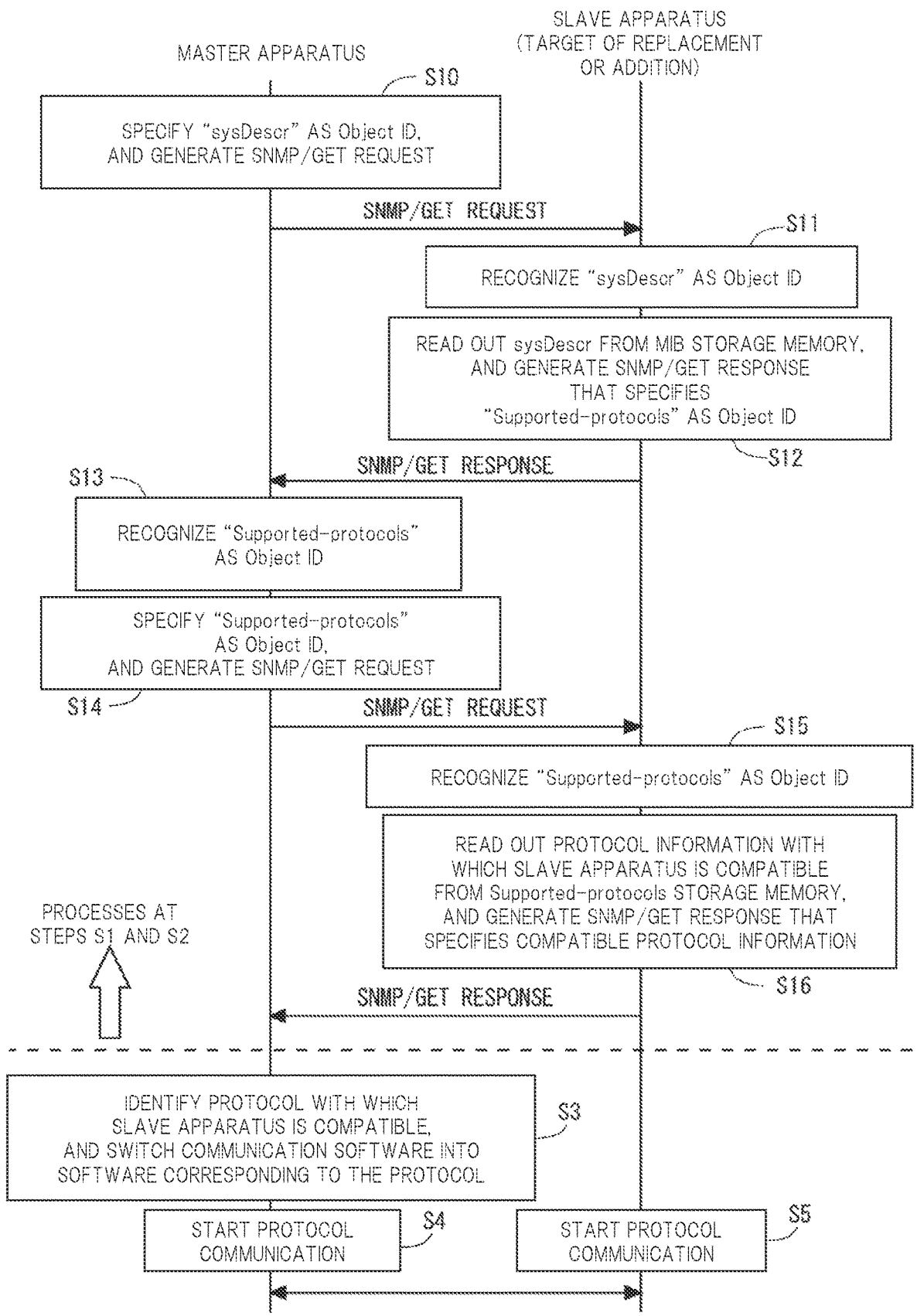

FIG. 5

ObjectID[sysDescr]
    =iso.org.dod.internet.mgmt.mib-2.system.sysDescr
    =1.3.6.1.2.1.1.1

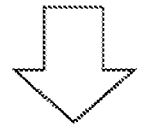
MASTER APPARATUS →
SLAVE APPARATUS

INFORMATION REGARDING sysDescr IN
MIB STORAGE MEMORY OF SLAVE APPARATUS

```
sysDescr {
    AAA, //SYSTEM INFORMATION A
    BBB, //SYSTEM INFORMATION B
    CCC, //SYSTEM INFORMATION C
    ObjectID[Supported-protocols], //PROTOCOL INFORMATION
    ...
    ZZZ, //SYSTEM INFORMATION Z
}
```

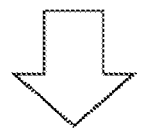
SLAVE APPARATUS →
MASTER APPARATUS

ObjectID[Supported-Protocol]
    =iso.org.dod.internet.private.enterprises.supported-protocols
    =1.3.6.1.4.1.n

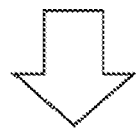
MASTER APPARATUS →
SLAVE APPARATUS

INFORMATION IN Supported-protocols
STORAGE MEMORY OF SLAVE APPARATUS

```
Supported-protocols {
    protocol A, //COMPATIBLE PROTOCOL NAME
}
```

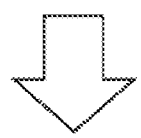
SLAVE APPARATUS →
MASTER APPARATUS

FIG. 7

ObjectID[sysDescr]
 = iso.org.dod.internet.mgmt.mib-2.system.sysDescr
 = 1.3.6.1.2.1.1.1

MASTER APPARATUS →
SLAVE APPARATUS

INFORMATION REGARDING sysDescr IN MIB STORAGE MEMORY OF SLAVE APPARATUS

```
sysDescr {
    AAA,    //SYSTEM INFORMATION A
    BBB,    //SYSTEM INFORMATION B
    CCC,    //SYSTEM INFORMATION C
    ObjectID[Supported-protocols], //PROTOCOL INFORMATION
    ...
    ZZZ,    //SYSTEM INFORMATION Z
}
```

SLAVE APPARATUS →
MASTER APPARATUS

ObjectID[Supported-Protcol]
 = iso.org.dod.internet.private.enterprises.supported-protocols
 = 1.3.6.1.4.1.n

MASTER APPARATUS →
SLAVE APPARATUS

INFORMATION IN Supported-protocols STORAGE MEMORY OF SLAVE APPARATUS

```
Supported-protocols {
    3,            //NUMBER OF COMPATIBLE PROTOCOLS
    protocol A,   //COMPATIBLE PROTOCOL NAME
    protocol B,   //COMPATIBLE PROTOCOL NAME
    protocol C,   //COMPATIBLE PROTOCOL NAME
}
```

SLAVE APPARATUS →
MASTER APPARATUS

NETWORK MANAGEMENT AND COMMUNICATION PROTOCOL ANALYSIS FOR NETWORK DEVICES IN A NETWORK

CROSS-REFERENCE TO RELATED APPLICATIONS

The disclosure of Japanese Patent Application No. 2021-035128 filed on Mar. 5, 2021 including the specification, drawings and abstract is incorporated herein by reference in its entirety.

BACKGROUND

The present invention relates to a non-transitory computer-readable medium including a network managing program, a network system, and a network managing method. For example, the present invention relates to a non-transitory computer-readable medium including a network managing program, a network system, and a network managing method for managing a network configured so that a slave apparatus connected to the network managed by a master apparatus is added or replaced.

In recent years, it has been practiced to connect various devices to a network to construct one system. As one of such network systems, there is an industrial network system in which devices in a factory or the like are connected to each other via a network to monitor an operating status of the devices and control the devices. In such an industrial network system, a plurality of devices is collectively introduced in a state where a configuration and specifications of the entire system are determined in advance. Further, in the industrial network system, in a case where any device breaks down, the device is replaced by a new device. Further, in the industrial network system, a new device is also added thereto after constructing the system. However, in the industrial network system, when the device is replaced or added, the device to be replaced or added may use a protocol other than a communication protocol that is set at the time of system construction. Therefore, Patent Document 1 discloses a technique for delivering setting information to a device that uses a different communication protocol.

In the technique described in Patent Document 1, a management apparatus delivers the setting information to the device (for example, a network device). Specifically, the management apparatus described in Patent Document 1 selects a setting for preferentially using a second protocol different from a first protocol that is an SNMP compared with the first protocol. In a case where the device as a target to deliver the setting information supports the second protocol, the management apparatus delivers setting information based on the specifications of the second protocol to the device. In a case where the setting for preferentially using the second protocol compared with the first protocol is selected and the device as the target to deliver the setting information does not support the second protocol, the management apparatus delivers setting information based on the specifications of the first protocol to the device.

There are disclosed techniques listed below.
[Patent Document 1] Japanese Unexamined Patent Application Publication No. 2018-41146

SUMMARY

However, in the network system, in a case where the network device (for example, a slave apparatus) managed by the management apparatus (for example, a master apparatus) is to be replaced or added, it is unknown whether there is a communication protocol that can commonly be used by the master apparatus and the slave apparatus or not. For that reason, in a case where a slave apparatus is newly introduced, a communication protocol used by the slave apparatus is manually analyzed by a network analyzer or the like, and a communication protocol to be used at an initial stage of introduction is manually set on the basis of the analysis result. At this time, software regarding the communication protocol is manually introduced, but due to a manual operation, a problem that mistakes such as different software to be applied may occur. The technique described in Patent Document 1 cannot solve such a problem.

The other object and new feature will become apparent from description of the present specification and the accompanying drawings.

According to one embodiment, a non-transitory computer-readable medium includes a network managing program to be executed by an operation unit of a master apparatus. The master apparatus is configured to manage a slave apparatus connected to a network on a basis of a Simple Network Management Protocol (SNMP). The network managing program includes: a first requesting process configured to generate a first request command for requesting system description information and transmit the generated first request command to the slave apparatus, the system description information containing system information of the slave apparatus; a second requesting process configured to generate, in a case where a specific object ID is contained in the system description information received by a first response command, a second request command including the specific object ID and transmit the second request command to the slave apparatus, the first response command being replied from the slave apparatus in response to the first request command, the specific object ID designating protocol information that can be used by the slave apparatus; and a communication software selecting process configured to refer to a protocol name corresponding to the slave apparatus to start communication with the slave apparatus after communication software for executing the communication with the slave apparatus is switched into communication software corresponding to a protocol that can be used by the slave apparatus, the protocol name being included in a second response command replied from the slave apparatus in response to the second request command.

According to the one embodiment, the network managing program can reduce a setting error of a communication protocol that is used between a slave apparatus and a master apparatus.

BRIEF DESCRIPTION OF THE DRAWINGS

FIG. 1 is a block diagram of a network system according to a first embodiment.

FIG. 2 is a sequence diagram for explaining a procedure for adding a slave apparatus in a case where a network managing method according to the first embodiment is not applied thereto.

FIG. 3 is a sequence diagram for explaining a procedure for adding a slave apparatus in a case where the network managing method according to the first embodiment is applied thereto.

FIG. 4 is a sequence diagram for explaining the procedure for adding a slave apparatus in a network system according to the first embodiment.

FIG. 5 is a diagram for explaining commands to be transmitted or received in the network system according to the first embodiment.

FIG. 7 is a diagram for explaining commands to be transmitted or received in a network system according to a second embodiment.

DETAILED DESCRIPTION

Figure 6:
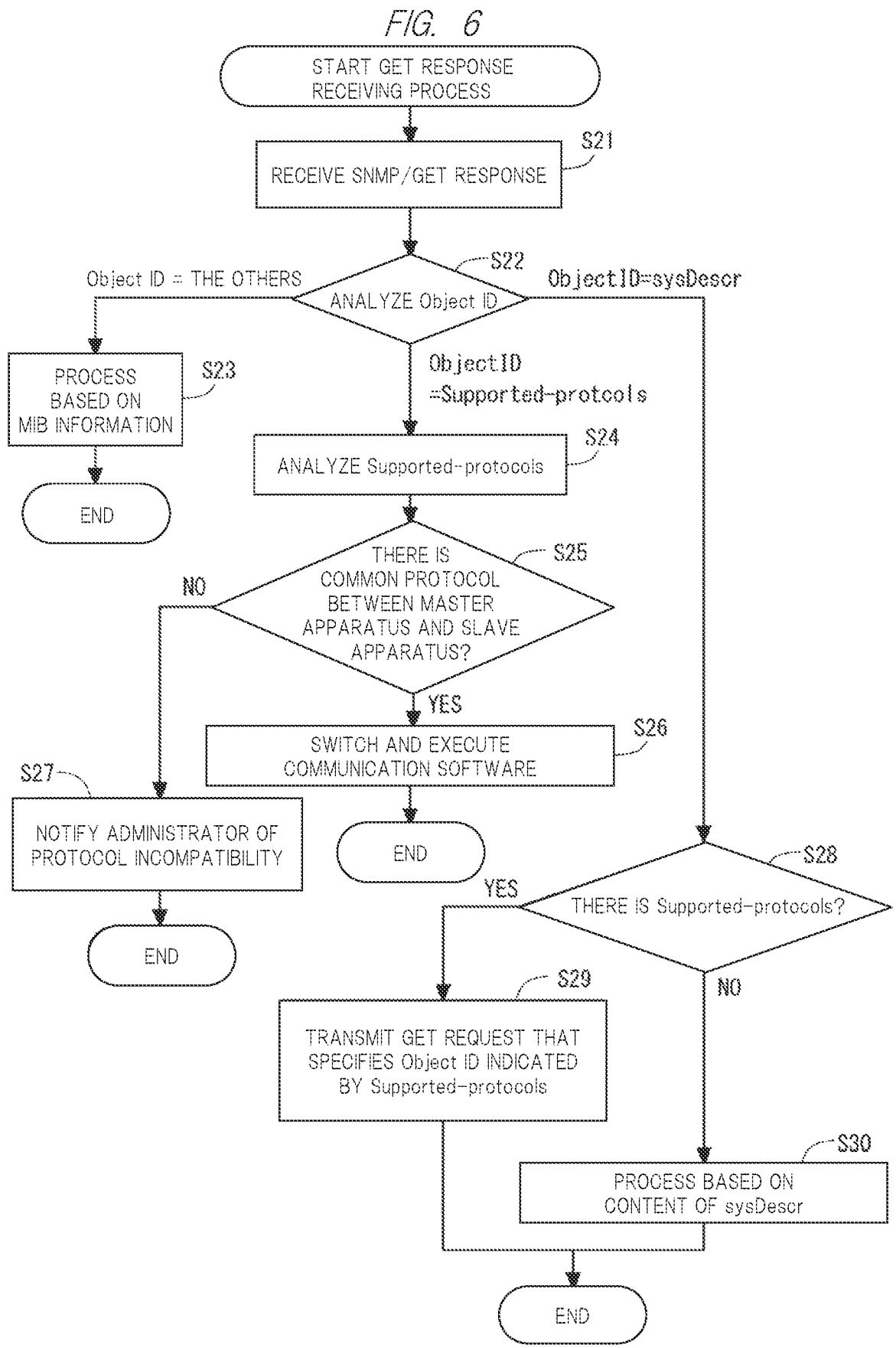
FIG. 6 is a flowchart for explaining an operation at the time of reception of a response command by a master apparatus in the network system according to the first embodiment.

In order to clarify explanation thereof, the following description and the drawings are appropriately omitted or simplified. Further, each element described in the drawings as a functional block that executes various processes can be configured by a CPU, a memory, and other circuits in terms of hardware, or can be realized by programs loaded on the memory in terms of software. Therefore, it is understood by a person having ordinary skill in the art that these functional blocks can be realized by hardware only, software only, or a combination thereof, and are not limited to any of them. Note that in each drawing, the same reference numeral is applied to the same element, and duplicate explanation is omitted as necessary.

Further, the program described above can be stored using any of various types of non-transitory computer-readable media, and can be supplied to a computer. The non-transitory computer-readable media include various types of tangible storage media. Examples of the non-transitory computer-readable media include magnetic recording media (for example, flexible disks, magnetic tapes, and hard disk drives), optomagnetic recording media (for example, optomagnetic discs), CD-ROMs (Read Only Memory) CD-Rs, CD-R/Ws, semiconductor memories (for example, mask ROMs, PROMs (Programmable ROMs), EPROMs (Erasable PROM), flash ROMs, and RAMs (Random Access Memory)). Further, the program may be supplied to the computer by various types of transitory computer readable media. Examples of the transitory computer readable media include electric signals, optical signals, and electromagnetic waves. Each of the transitory computer readable media can supply the program to the computer via a wired communication path such as an electric wire or an optical fiber, or a wireless communication path.

First Embodiment

FIG. 1 illustrates a block diagram of a network system 1 according to a first embodiment. As illustrated in FIG. 1, in the network system 1 according to the first embodiment, a master apparatus 10 is connected to each of a plurality of slave apparatuses (in the example of FIG. 1, slave apparatuses 11 to 13) via a network 20.

The master apparatus 10 is an apparatus configured to manage each of the slave apparatuses 11 to 13. Further, the master apparatus 10 and each of the slave apparatuses 11 to 13 mutually obtain information necessary for an operation by transmitting or receiving commands conforming to an SNMP (Simple Network Management Protocol) at the time of initial setting. This SNMP is a protocol that is standardized by RFC1157 for the purpose that the master apparatus monitors the slave apparatus. Note that the master apparatus may also be referred to as a manager apparatus. Further, the slave apparatus may also be referred to as an agent apparatus.

In this SNMP, a request command (for example, a command called GET REQUEST) is transmitted when information on the other side apparatus is to be obtained from the other side. Further, an apparatus that receives the request command transmits a response command (for example, a GET RESPONSE) to the other side apparatus as a reply command to the request command.

Here, in the SNMP, information desired to be obtained from the other side apparatus is specified in a format called an object ID. The apparatus that transmits the request command transmits the request command to the other side apparatus so that the object ID is included in the request command. Details of the format of the object ID will be described later.

Subsequently, a network managing method by the network system according to the first embodiment will be described. In the following description, in order to explain features of the network managing method according to the first embodiment, a manual network managing method is illustrated as a comparative example, the manual network managing method according to the comparative example and the network managing method according to the first embodiment will be described in comparison.

Therefore, FIG. 2 illustrates a sequence diagram for explaining a procedure for adding a slave apparatus in a case where the network managing method according to the first embodiment is not applied thereto (for example, the comparative example). Note that a procedure for replacing a slave apparatus is the same as a procedure for adding a slave apparatus to a network. Therefore, in the description of an operation including Steps illustrated in FIG. 2, a network managing method when a slave apparatus is added will be described.

As illustrated in FIG. 2, in the network managing method according to the comparative example, after a slave apparatus is added, a trial operation for protocol communication is executed for each of the master apparatus and the slave apparatus (Steps S101 and S102). In this trial operation of the protocol communication, an operator who adds the slave apparatus analyzes a communication protocol that can be sed by the slave apparatus to be caused to participate in a network using a network analyzer or the like (Step S103). Then, in a case where the master apparatus cannot use a communication protocol the same as the communication protocol determined by the analysis at Step S103, communication software corresponding to the communication protocol that can be used by the slave apparatus is installed in the master apparatus side (Step S104). Then, after preparation of the software is completed, communication using the protocol that can commonly be used by the master apparatus and the slave apparatus is started (Steps S105 and S106).

In the procedure illustrated in FIG. 2, the operator manually confirms the communication protocol that can be used by each of the master apparatus and the slave apparatus, and prepares software for the communication protocol that can commonly be used by the master apparatus and the slave apparatus (for example, Steps S103 and S104). For that reason, in the network managing method according to the comparative example illustrated in FIG. 2, a problem that a setting error or the like occurs may occur at Steps S103 and S104.

Therefore, in the network managing method according to the first embodiment, confirmation of the communication protocol at the start of introduction of the slave apparatus is executed using a network managing program executed by the master apparatus. Each of the master apparatus and the slave apparatus that participate in the network system includes an operation unit capable of executing software, and executes various processes using the software. Further, the network managing method according to the first embodiment is realized by the network managing program. This network managing program includes first software to be executed by the operation unit of the master apparatus and second software to be executed by the operation unit of the slave apparatus. The first software and the second software execute communication in accordance with the SNMP together. Further, the network managing method according to the first embodiment has one of the features in which system information in which information conforming to the format of the object ID of the SNMP (hereinafter, this object ID is referred to as a "specific object ID") is described is stored in a slave apparatus in advance, and information regarding a protocol with which the slave apparatus can be compatible is specified by the specific object ID.

Subsequently, FIG. 3 illustrates a sequence diagram for explaining a procedure for adding a slave apparatus in a case where the network managing method according to the first embodiment is applied thereto. As illustrated in FIG. 3, the network system 1 according to the first embodiment first executes protocol analysis communication for analyzing an available communication protocol (Steps S1 and S2). In this protocol analysis communication, the master apparatus and the slave apparatus execute communication based on the SNMP. Then, the master apparatus switches communication software so that the slave apparatus grasped by the master apparatus in the protocol analysis communication can use the available communication protocol (Step S3). Then, the master apparatus and the slave apparatus start communication based on a predetermined communication protocol in accordance with completion of switching of the communication software at Step S3 (Steps S4 and S5).

Here, the protocol analysis communication at Steps S1 and S2 will be described more specifically. Therefore, FIG. 4 illustrates a sequence diagram for explaining the procedure for adding a slave apparatus in the network system 1 according to the first embodiment.

As illustrated in FIG. 4, in the network managing method according to the first embodiment, Steps S10 to S16 are executed as the protocol analysis communication. At Step S10, the master apparatus generates a first request command (for example, a GET REQUEST transmitted from the master apparatus to the slave apparatus between Step S10 and Step S11) for requesting system description information (for example, sysDescr) containing system information of the slave apparatus in a format conforming to the standard of an SNMP as an object ID. Then, when the process at Step S10 is completed, the master apparatus transmits the first request command to the slave apparatus.

Then, the slave apparatus recognizes the first request command (Step S11). Subsequently, the slave apparatus reads out the system description information, which is stored as sysDescr, from an MIB (Management Information Base) storage memory on the basis of the object ID included in the first request command, and generates a first response command including the sysDescr (for example, a GET RESPONSE to be transmitted from the slave apparatus to the master apparatus between Step S12 and Step S13). When the process at Step S12 is completed, the slave apparatus transmits the first response command to the master apparatus.

Here, in the SNMP, the MIB storage memory is defined as a data storage region that can be read out by the object ID. Further, various kinds of information, which at least contains the sysDescr that is defined in the SNMP and in which the settings of the device are described, are stored in this MIB storage memory. Further, in the network system 1 according to the first embodiment, a specific object ID (for example, an object ID by which access to the Supported-protocols is specified), which will be described later, is described in the sysDescr stored in the slave apparatus on the basis of a description format of the object ID.

When the master apparatus receives the first response command, the master apparatus refers to the sysDescr included in the first response command to recognize the object ID indicated by the Supported-protocols (Step S13). The master apparatus generates a second request command (for example, a GET REQUEST transmitted from the master apparatus to the slave apparatus between Step S14 and Step S16) using this Supported-protocols recognized at Step S13 as the object ID (Step S14). Then, the master apparatus transmits the second request command generated at Step S14 to the slave apparatus.

When the slave apparatus receives the second request command, the slave apparatus refers to the object ID to recognize that the second request command is the Supported-protocols (Step S15). On the basis of the object ID recognized at Step S15, the slave apparatus reads out protocol information, with which the slave apparatus is compatible, from a memory in which the Supported-protocols are stored, and generates a second response command that specifies compatible protocol information (for example, a GET RESPONSE to be transmitted from the slave apparatus to the master apparatus between Step S16 and Step S3) (Step S16). Note that a protocol name that the slave apparatus can use is described in this protocol information. Then, the slave apparatus transmits the second response command generated at Step S16 to the master apparatus.

When the master apparatus receives the second response command, the master apparatus switches communication software at Step S3 on the basis of the second response command. In this process of switching communication software, the master apparatus refers to the protocol information contained in the second response command to recognize the protocol name that the slave apparatus can use, and switches communication software to be executed for communication with the slave apparatus into communication software corresponding to the recognized protocol. Then, the master apparatus starts communication between the master apparatus and the slave apparatus in accordance with completion of this process of switching the communication software (Steps S4 and S5).

Here, the processes at Steps S10 to S16 will be described in detail while illustrating a concrete example of information on the object ID, the sysDescr, and the Supported-protocols. Therefore, FIG. 5 illustrates a diagram for explaining commands to be transmitted or received in the network system according to the first embodiment.

First, an object ID that specifies sysDescr is an object ID defined by an SNMP. A value of a first field thereof is 1 (iso); a value of a second field thereof is 3 (org); a value of a third field thereof is 6 (dod); a value of a fourth field thereof is 1 (internet); a value of a fifth field thereof is 2 (mgmt); a value of a sixth field thereof is 1 (MIB-2); a value of a seventh field thereof is 1 (system); and a value of an eighth field thereof is 1 (sysDescr).

When the slave apparatus receives the object ID that specifies the sysDescr, the slave apparatus reads out the sysDescr stored in an MIB storage memory. As illustrated in FIG. 5, plural kinds of system information of agent apparatuses are contained in the sysDescr, and the object ID whose value specifying a location where the protocol information is stored is Supported-protocols is described as one of this system information.

The slave apparatus generates a first response command including this sysDescr, and transmits it to the master apparatus. Here, the object ID described in the sysDescr included in the first response command has a value of a first field of 1 (iso), a value of a second field of 3 (org), a value of a third field of 6 (dod), a value of a fourth field of 1 (internet), a value of a fifth field of 4 (private), a value of a sixth field of 1 (enterprise), and a value of a seventh field of n (Supported-protocols). In the example illustrated in FIG. 5, the value of the seventh field is set to n, but what kind of value is set to this value can be determined arbitrarily by usage of the slave apparatus.

The master apparatus transmits the object ID that specifies the Supported-protocols to the slave apparatus as a second request command. Then, the slave apparatus reads out information on the Supported-protocols from a memory on the basis of the second request command. Further, the slave apparatus transmits the second response command containing the information on the Supported-protocols thus read out to the master apparatus. A protocol name with which the slave apparatus is compatible is described in this information on the Supported-protocols. The master apparatus refers to the protocol name described in the Supported-protocols to determine communication software to be used for communication with the slave apparatus.

Since the master apparatus according to the first embodiment has one of the features in an operation when a response command is received, a process of receiving a response command by the master apparatus will be described in detail. Therefore, FIG. 6 illustrates a flowchart for explaining an operation at the time of reception of a response command by the master apparatus in the network system according to the first embodiment.

As illustrated in FIG. 6, when the master apparatus receives a response command (Step S21), the master apparatus executes analysis of an object ID included in the response command (Step S22). In a case where the object ID is other than one that specifies sysDescr and Supported-protocols in this analysis of the object ID at Step S22, the master apparatus executes a process based on an MIB information contained in the response command, and terminates the process for the response command (Step S23).

Further, in a case where a result of analyzing the object ID at Step S22 is the sysDescr (for example, Step S13 in FIG. 4), the master apparatus confirms whether an object ID that specifies the Supported-protocols exists in the received sysDescr or not (Step S28). In a case where it is determined at Step S28 that there is no object ID that specifies the Supported-protocols, the master apparatus executes a process based on the content of the received sysDescr, and terminates the processes (Step S30). On the other hand, in a case where it is determined at Step S28 that there is an object ID that specifies the Supported-protocols in the sysDescr, the master apparatus transmits a second request command including the object ID that indicates the Supported-protocols to the slave apparatus, and terminates the processes for the response command (Step S29).

Further, in a case where a result of analyzing the object ID at Step S22 is the Supported-protocols (for example, Step S3 in FIG. 4), the master apparatus analyzes protocol information contained in the second response command (for example, information on the Supported-protocols) (Step S24). Then, the master apparatus determines whether there is a communication protocol that can commonly be used by the master apparatus and the slave apparatus or not on the basis of the analysis result at Step S24 (Step S25). In a case where it is determined that there is the communication protocol that can commonly be used by the master apparatus and the slave apparatus in the determination process at Step S25, the master apparatus switches communication software to be executed into communication software corresponding to the communication protocol determined as commonly available, and terminates the processes for the response command (Step S26). Further, in a case where it is determined that there is no communication protocol that can commonly be used by the master apparatus and the slave apparatus in the determination process at Step S25, the master apparatus notifies an operator or an administrator that there is no communication protocol that can commonly be used by the master apparatus and the slave apparatus, and terminates the processes for the response command (Step S27).

As described above, in the network system 1 according to the first embodiment, the specific object ID for reading out the protocol information for which the object ID for calling by the SNMP to the memory mounted on the slave apparatus to be caused to participate in the network is not defined is described in the system information that can be called by the procedure of the SNMP (for example, the sysDescr). After the slave apparatus stores such system description information, the master apparatus is caused to have a function of generating a request command that specifies the specific object ID as a process when the specific object ID is included in the response command. Since the network system 1 according to the first embodiment has such a configuration, the master apparatus can grasp the communication protocol that the slave apparatus can use by communication processing conforming to the SNMP between the master apparatus and the slave apparatus.

Since the master apparatus directly grasps the communication protocol that the slave apparatus can use by the operation of the program in this manner, no manual work is required. Therefore, it is possible to reduce a setting error at the time of introduction of the slave apparatus.

Further, in the network system 1 according to the first embodiment, in a case where there is no communication protocol that can commonly be used by the master apparatus and the slave apparatus, the master apparatus issues notification of protocol incompatibility to the operator or the administrator. Therefore, it becomes easy to introduce the communication software that matches the slave apparatus to the master apparatus without mistakes.

Second Embodiment

In a second embodiment, another form of the network managing method according to the first embodiment will be described. In the second embodiment, processes in a case where there is a plurality of communication protocols that is included in Supported-protocols and a slave apparatus can use will be described.

Thus, FIG. 7 illustrates a diagram for explaining commands to be transmitted or received in a network system according to the second embodiment. As illustrated in FIG. 7, in the network system according to the second embodiment, information on the Supported-protocols to be stored in the slave apparatus is different from that in the network system according to the first embodiment.

Specifically, in the network system according to the second embodiment, the number of protocols with which the slave apparatus is compatible and a plurality of corresponding protocol names are described as the information on the Supported-protocols. In the network system according to the second embodiment, information on Supported-protocols illustrated in FIG. 7 is contained in a second response command generated as a reply to a second request command that includes the Supported-protocols as an object ID.

Further, when the master apparatus according to the second embodiment receives the information on the Supported-protocols illustrated in FIG. 7, the master apparatus refers to the protocol names described in the received information on the Supported-protocols to select a protocol that can commonly be used by the master apparatus and the slave apparatus. Then, the master apparatus switches communication software to be executed into communication software corresponding to the selected protocol to start communication with the slave apparatus.

As described above, in the network system according to the second embodiment, a plurality of communication protocols that the slave apparatus can use is described. This makes it possible to increase a possibility that the communication protocol that can commonly be used by the master apparatus and the slave apparatus matches.

Third Embodiment

In a third embodiment, still another from of the network managing method according to the first embodiment will be described. In the third embodiment, a method of managing communication software in a case where a plurality of slave apparatuses exists in a network will be described.

Figure 8:
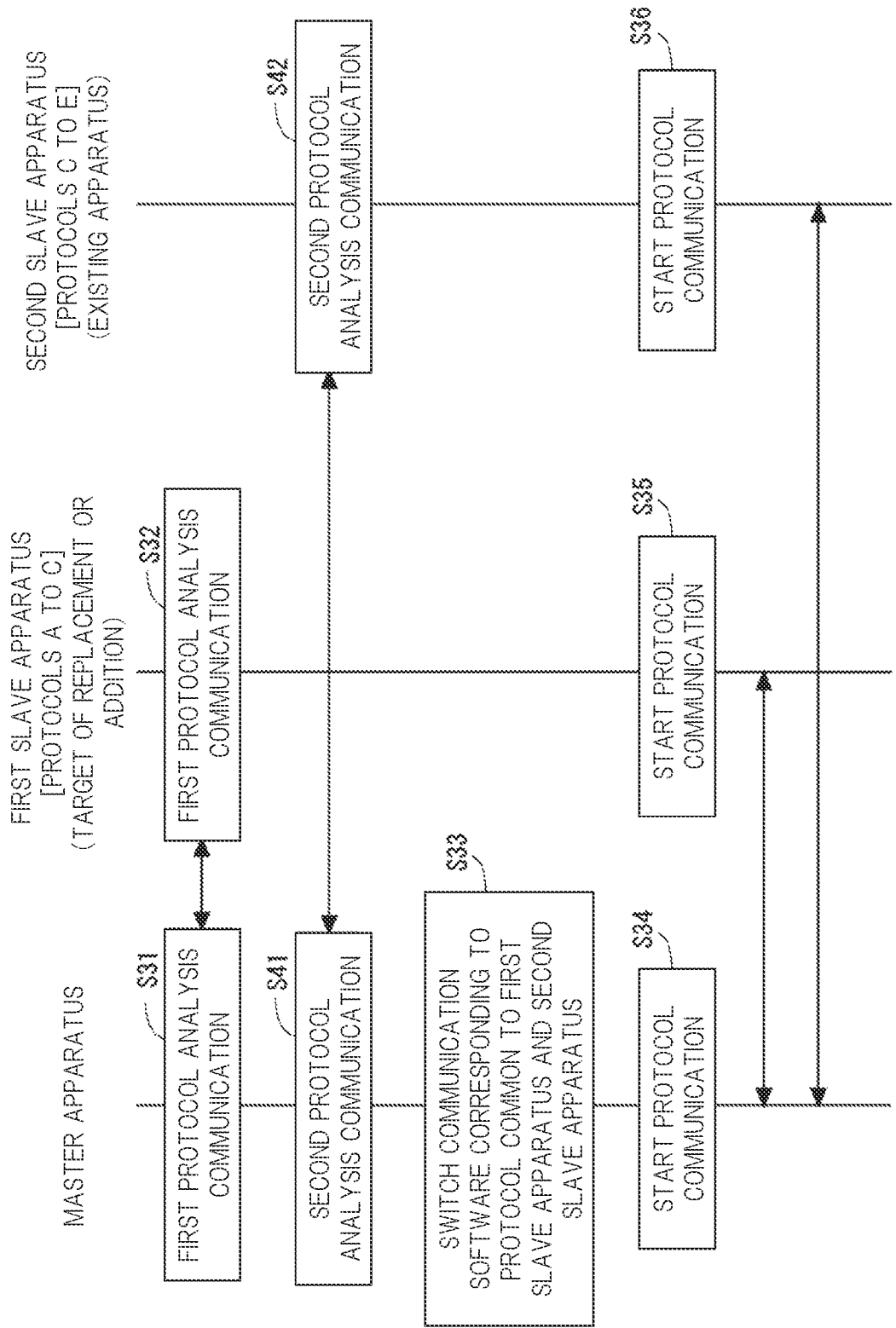
FIG. 8 is a sequence diagram for explaining a procedure for adding a slave apparatus in a case where a network managing method according to a third embodiment is applied thereto.

Thus, FIG. 8 illustrates a sequence diagram for explaining a procedure for adding a slave apparatus in a case where a network managing method according to the third embodiment is applied thereto. In the example illustrated in FIG. 8, in a network system according to the third embodiment, a master apparatus executes communication with a first slave apparatus and a second slave apparatus. Here, in the example illustrated in FIG. 8, the first slave apparatus is an apparatus as a target of addition, and the second slave apparatus is an apparatus that has already participated in the network. Further, communication protocols that the first slave apparatus can use are protocols A to C, and communication protocols that the second slave apparatus can use are protocols C to E.

As illustrated in FIG. 8, in the network system according to the third embodiment, the master apparatus and the first slave apparatus execute first protocol analysis communication therebetween (Steps S31 and S32). In this first protocol analysis communication, the processes at Steps S10 to S16 illustrated in FIG. 4 are executed. Then, by the first protocol analysis communication, the master apparatus recognizes that the communication protocols that the first slave apparatus can use are the protocols A to C.

Subsequently, in the network system according to the third embodiment, the master apparatus and the second slave apparatus execute second protocol analysis communication therebetween (Steps S41 and S42). In this second protocol analysis communication, the processes of Steps S10 to S16 illustrated in FIG. 4 are executed between the master apparatus and the second slave apparatus. Then, by the second protocol analysis communication, the master apparatus recognizes that the communication protocols that the second slave apparatus can use are the protocols C to E.

Subsequently, in the network system according to the third embodiment, the master apparatus switches communication software to be executed into communication software corresponding to a communication protocol (for example, the protocol C) that can commonly be used by the first slave apparatus and the second slave apparatus in accordance with information on Supported-protocols obtained by the first protocol analysis communication and the second protocol analysis communication (Step S33). After this switching of the communication software, the master apparatus starts communication with the first slave apparatus and the second slave apparatus (Steps S34, S35, and S36).

As described above, in the network system according to the third embodiment, by executing the protocol analysis communication with each of the plurality of slave apparatuses, the master apparatus can recognize the communication protocol with which each of the plurality of slave apparatuses is compatible. As a result, in the network system according to the third embodiment, the master apparatus can recognize the communication protocol that can commonly be used by the plurality of slave apparatuses, and execute communication with the plurality of slave apparatuses by the communication software corresponding to the communication protocol.

As described above, the present invention made by the inventor of the present application has been described specifically on the basis of the embodiments. However, the present invention is not limited to the embodiments that have already been described, and it goes without saying that various modifications are possible without departing from the substance of the present invention.

What is claimed is:

1. A non-transitory computer-readable medium including a network managing program to be executed by an operation unit of a master apparatus, the master apparatus being configured to manage a slave apparatus connected to a network on a basis of a Simple Network Management Protocol (SNMP), the network managing program comprising:

a first requesting process configured to generate a first request command for requesting system description information and transmit the generated first request command to the slave apparatus, the system description information containing system information of the slave apparatus;

a second requesting process configured to generate, in a case where a specific object ID is contained in the system description information received by a first response command, a second request command including the specific object ID and transmit the second request command to the slave apparatus, the first response command being replied from the slave apparatus in response to the first request command, the specific object ID designating protocol information that can be used by the slave apparatus; and a communication software selecting process configured to refer to a protocol name corresponding to the slave apparatus to start communication with the slave apparatus after communication software for executing the communication with the slave apparatus is switched into communication software corresponding to a protocol that can be used by the slave apparatus, the protocol name being included in a second response command replied from the slave apparatus in response to the second request command, wherein, in the communication software selecting process, in a case where a protocol name that can be used by the master apparatus is not included in the protocol name corresponding to the slave apparatus and included in the second response command, an administrator is notified that there is no protocol that can be used in common by the master apparatus and the slave apparatus.

2. The non-transitory computer-readable medium according to claim 1, wherein the specific object ID described in the system description information is described in the system description information in advance.

3. The non-transitory computer-readable medium according to claim 1, wherein each of the first request command, the second request command, the first response command, and the second response command includes an object ID in a format conforming to the SNMP.

4. The non-transitory computer-readable medium according to claim 1,
wherein a plurality of protocol names is included in the protocol name corresponding to the slave apparatus and included in the second response command, and
wherein in the communication software selecting process, a protocol compatible with the slave apparatus is selected from the plurality of protocol names, and the communication software is switched into communication software corresponding to the selected protocol.

5. The non-transitory computer-readable medium according to claim 1,
wherein the slave apparatus includes a plurality of slave apparatuses, and
wherein in the communication software selecting process, the protocol name included in the second response command received from each of the plurality of slave apparatuses is referred to, and communication software corresponding to a protocol that can be used in common among the plurality of slave apparatuses to start communication with the plurality of slave apparatuses.

6. A network system comprising a slave apparatus and a master apparatus connected to a network, the slave and master devices being interconnected to the network on a basis of a Simple Network Management Protocol (SNMP), the network system comprising:
first software executed by an operation unit of the master apparatus; and
second software executed by an operation unit of the slave apparatus,
wherein the first software is configured to execute:
a first requesting process configured to generate a first request command for requesting system description information and transmit the generated first request command to the slave apparatus, the system description information containing system information of the slave apparatus;
a second requesting process configured to generate, in a case where a specific object ID is contained in the system description information received by a first response command, a second request command including the specific object ID and transmit the generated second request command to the slave apparatus, the first response command being replied from the slave apparatus in response to the first request command, the specific object ID designating protocol information that can be used by the slave apparatus; and
a communication software selecting process configured to refer to a protocol name corresponding to the slave apparatus to start communication with the slave apparatus after communication software for executing the communication with the slave apparatus is switched into communication software corresponding to a protocol that can be used by the slave apparatus, the protocol name being included in a second response command replied from the slave apparatus in response to the second request command,
wherein the second software is configured to execute:
a first responding process configured to generate the first response command containing the system description information stored in the slave apparatus in response to the first request command, and transmit the generated first response command to the master apparatus; and
a second responding process configured to generate, in a case where the specific object ID is included in the second request command, the second response command containing the protocol information in which the protocol name corresponding to the slave apparatus specified by the specific object ID is described, and transmit the generated second response command to the slave apparatus, and
wherein, in a case where a protocol name that can be used by the master apparatus is not included in the protocol name corresponding to the slave apparatus and included in the second response command, an administrator is notified that there is no protocol that can be used in common by the master apparatus and the slave apparatus.

7. A network managing method to be executed using commands transmitted or received between a master apparatus for managing a slave apparatus on a basis of a Simple Network Management Protocol (SNMP) and the slave apparatus on a basis of software processing executed by each of the master apparatus and the slave apparatus, the network managing method comprising:
a first requesting process configured to generate, by the master apparatus, a first request command for requesting system description information and transmit the generated first request command to the slave apparatus, the system description information containing system information of the slave apparatus;
a first responding process configured to generate, by the slave apparatus, a first response command containing the system description information stored in the slave apparatus in response to the first request command, and transmit the generated first response command to the master apparatus;
a second requesting process configured to generate, by the master apparatus, a second request command including a specific object ID in a case where the specific object ID is contained in the system description information received by the first response command, and transmit the generated second request command to the slave apparatus, the specific object ID designating protocol information that can be used by the slave apparatus;
a second responding process configured to generate, by the slave apparatus, a second response command containing the protocol information in a case where the specific object ID is included in the second request command, and transmit the generated second response command to the slave apparatus, the protocol name corresponding to the slave apparatus specified by the specific object ID being described in the protocol information; and a communication software selecting process configured to refer, by the master apparatus, to a protocol name corresponding to the slave apparatus to start communication with the slave apparatus after communication software for executing communication with the slave apparatus is switched into communication software corresponding to a protocol that can be used by the slave apparatus, the protocol name being included in the second response command, wherein, in a case where a protocol name that can be used by the master apparatus is not included in the protocol name corresponding to the slave apparatus and included in the second response command, an administrator is notified that there is no protocol that can be used in common by the master apparatus and the slave apparatus.

* * * * *